April 15, 1930.　　　　　N. SEAHOLM　　　　　1,754,650
SURGEON'S KNIFE
Filed Oct. 26, 1926
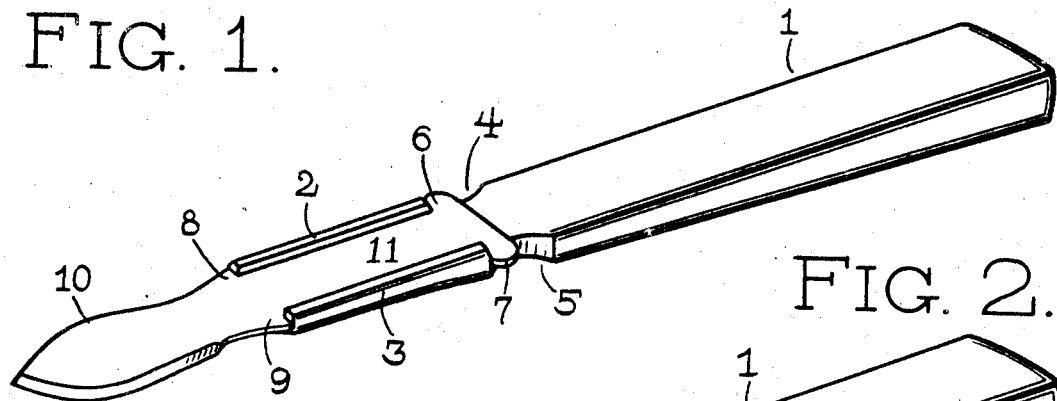
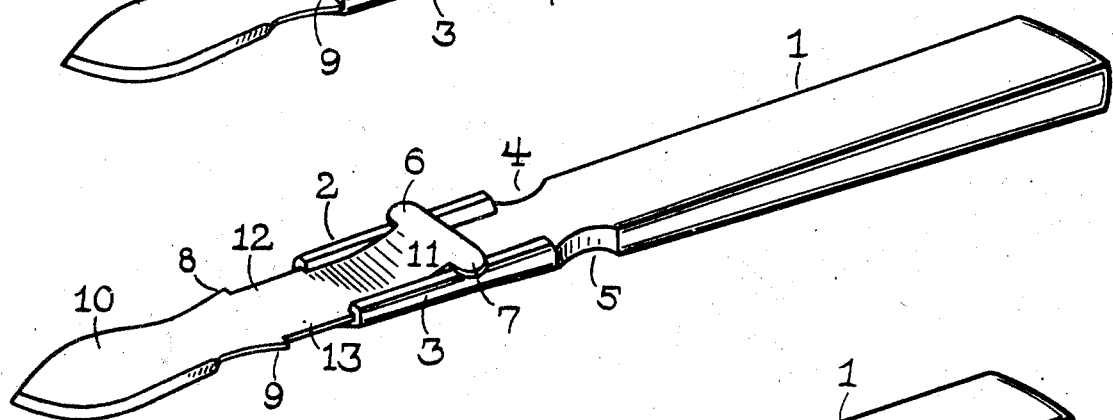
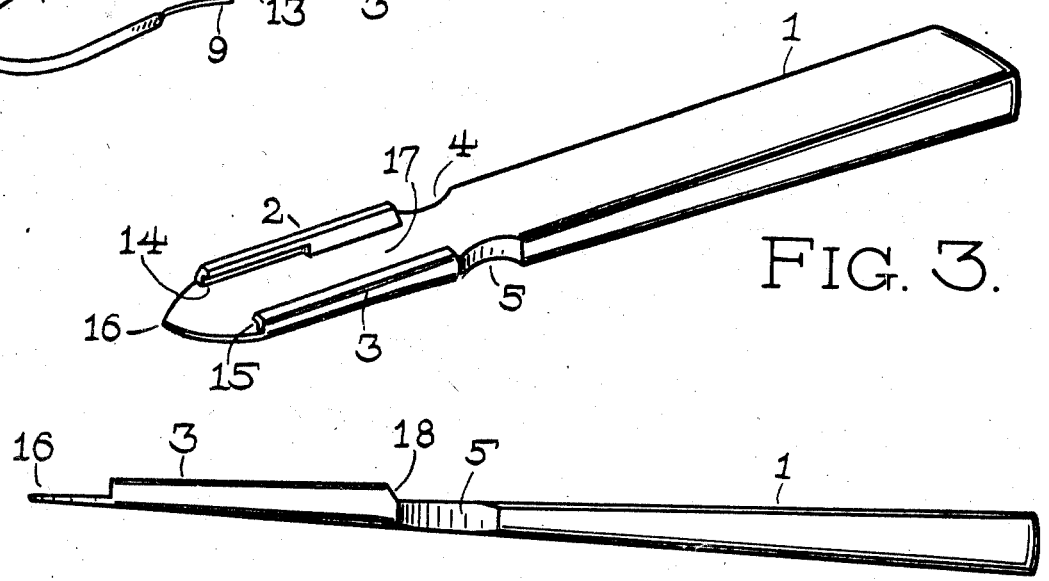
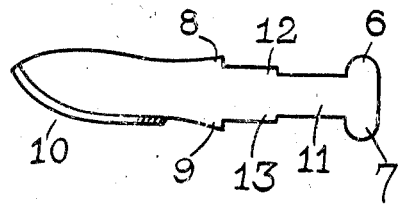
Nils Seaholm — Inventor
By His Attorney Frank Carlson Patented Apr. 15, 1930

1,754,650

UNITED STATES PATENT OFFICE

NILS SEAHOLM, OF MOUNT VERNON, NEW YORK

SURGEON'S KNIFE

Application filed October 26, 1926. Serial No. 144,330.

This invention relates to detachable blade knives used in surgery, and particularly to the class wherein a handle is provided with a pair of slotted opposite projections and a blade having a suitable shank which may be caused to engage said handle projections so as to be assembled with the handle to form the complete knife.

The primary object of my invention is to provide a knife which has a detachable blade which may be sharpened or exchanged, and which is designed for strength of form.

Another object is to provide a knife of the character mentioned with a unitary handle which has no moving parts, and which is provided with guards and reinforcements for a blade which may be secured thereto.

A further object is to make a knife and a separable blade which are both exceedingly simple and economical to manufacture.

Further objects and the inherent advantages of my invention will be disclosed as the specification proceeds.

In the accompanying drawing forming part of this specification:—

Fig. 1 is a perspective view of a surgeon's knife made according to my invention and embodying the same.

Fig. 2 is a similar view with the blade in an intermediate position on the handle in partial assembly therewith, as it appears when being removed or being attached.

Fig. 3 is a similar view of the handle member of my invention.

Fig. 4 is another view of the same part.

Fig. 5 is a view of the blade member of the invention.

Throughout the views the same reference characters indicate the same parts.

In the practice of my invention, a handle 1 is provided with a blade seat section 17 and on the edges of the latter, a pair of opposite guards or blade grips 2 and 3. The blade grips 2 and 3 are provided with undercut slots at 14 and 15, respectively, which extend only part way along their facing sides. The forward portion of the blade seat terminates in a point at 16, while between the seat and the handle proper, a pair of similar indentations 4 and 5 reduce the cross section of the member.

A blade 10, designed to co-operate with and be borne by the handle, also forms a part of my invention and is provided with a narrow shank 11 adapted to fit snugly between the blade grips or guards 2 and 3 on the handle.

This shank terminates at the rear in a pair of lateral side tongues or shoulders 6 and 7 which are adapted to engage the rear extremities of the guards 2 and 3 to prevent the blades from slipping forward on the handle when once set in place. And in order to prevent rearward movement of the blade, the same is further provided with a pair of stop shoulders 8 and 9 adapted to engage the forward extremities of guards 2 and 3.

However, in order to hold the blade down upon its seat, so that the other locating means become effective, the blade is also provided with a pair of shoulders at 12 and 13 which are adapted to engage the slots 14 and 15 in guards 2 and 3, respectively.

When it is desired to assemble the knife, the blade is laid upon point 16 and while tongues 6 and 7 are resting on guards 2 and 3, it is bent slightly by placing a finger upon the shank so that shoulders 12 and 13 may enter slots 14 and 15. The blade is then drawn upon the handle until shoulders 8 and 9 are stopped by the guards, when the tongues 6 and 7 will snap down beyond the guards, owing to the tendency of the blade to straighten out. The rear part of the guards may be inclined as at 18 to make a tight fit.

On thes other hand, when it is desired to remove the blade, it is but necessary to grip and lift the tongues or shoulders 6 and 7 with two fingers until they will clear the guards and then push the blade forward. The indentations 4 and 5 are provided as a convenience to render the blade tongues more accessible. The tongues or shoulders which actually serve as finger pieces will slide along the tops of the guards until the shoulders 12 and 13 clear their retaining slots 14 and 15, when the blade will spring clear of the guards.

Having now fully described my invention, I claim:—

1. A surgeon's knife including the combination with a handle having a blade seat projecting forwardly therefrom, there being a relatively narrow section between the handle proper and the blade seat, of a pair of oppositely disposed guards on said blade seat for locating and retaining said blade and a blade for mounting between said guards on said seat having a pair of diverging and aligned tongues at the inner extremity of said blade normally engaging the inner extremities of said guard and projecting outward between the blade seat and the handle to serve as finger pieces whereby to raise the inner end of said blade so as to permit said finger pieces to slide upon their respective guards and thereby release said blade from said seat and handle.

2. The combination of an imperforate knife blade terminating rearwardly in a pair of opposite diverging stop shoulders, a relatively reduced shank extending rearward from said shoulders and a distinct pair of opposite diverging tongues disposed upon the rear of said shank to serve as a pair of finger pieces whereby to bodily grip and manipulate said blade as a whole, there being a handle having means to engage between said stop shoulders and said finger pieces and intermediately to locate and retain said shank in order to retain said blade upon said handle.

3. The combination of a blade having a pair of corresponding stop shoulders, a main shank extending rearwardly from said shoulders and terminating in a second pair of corresponding shoulders, a reduced shank extending rearwardly beyond said second pair of shoulders, and a pair of opposite diverging terminal tongues disposed on said reduced shank in order to serve as finger pieces whereby to grip said blades as a whole for manipulation of the same, there being a handle having means to retain said main shank and engaging against said stop shoulders and said terminal tongues, and also engaging the sides of said reduced shank, whereby to locate said blade upon said handle.

4. A surgeon's knife including the combination with a blade having a shank provided with a plurality of shoulders thereon, of a handle having a forwardly projecting blade seat for receiving said shank including a pair of opposite corresponding guards having generally uniform inner edges and undercut sections beneath said inner guard edges extending inwardly along said guards from the forward extremities thereof, said undercut sections terminating intermediate the extremities of said guards and serving to retain said shank normally on said seat and thereby hold said blade in assembled relation to said handle.

Signed at 132 Nassau Street in the borough of Manhattan, county of New York, city and State of New York, this 25 day of Oct., 1926.

NILS SEAHOLM.